US008275490B2

(12) United States Patent
Brusilovsky et al.

(10) Patent No.: US 8,275,490 B2
(45) Date of Patent: Sep. 25, 2012

(54) SYSTEM AND METHOD FOR ESTIMATING AND DETECTING SPEED

(75) Inventors: Roman Brusilovsky, Clifton Park, NY (US); Joseph James Salvo, Schenectady, NY (US); John William Carbone, Niskayuna, NY (US); Daniel John Messier, Niskayuna, NY (US); Douglas Peters, Eden Prairie, MN (US); Ben Nielsen, Eden Prairie, MN (US); Matthew John Englund, Eden Prairie, MN (US)

(73) Assignee: General Electric Company, Niskayuna, NY (US)

( * ) Notice: Subject to any disclaimer, the term of this patent is extended or adjusted under 35 U.S.C. 154(b) by 297 days.

(21) Appl. No.: 12/695,321

(22) Filed: Jan. 28, 2010

(65) Prior Publication Data

US 2011/0184588 A1 Jul. 28, 2011

(51) Int. Cl.
*G08G 1/052* (2006.01)
(52) U.S. Cl. ............................................ 701/1; 701/119
(58) Field of Classification Search .............. 701/1, 409, 701/414, 415, 412, 426, 454, 93, 119, 121; 340/936, 466, 905, 441, 988, 901; 342/357.07, 342/357.1, 357.25; 73/178 R
See application file for complete search history.

(56) References Cited

U.S. PATENT DOCUMENTS

| 5,381,155 | A | 1/1995 | Gerber |
| 5,508,931 | A | 4/1996 | Snider |
| 6,462,675 | B1 | 10/2002 | Humphrey et al. |
| 7,397,365 | B2 | 7/2008 | Wang |
| 2007/0015117 | A1 | 1/2007 | Freund et al. |
| 2007/0028888 | A1* | 2/2007 | Jasem ........................ 123/198 D |
| 2007/0067086 | A1 | 3/2007 | Rothschild |
| 2008/0004789 | A1* | 1/2008 | Horvitz et al. ................ 701/117 |
| 2008/0252487 | A1 | 10/2008 | McClellan et al. |
| 2011/0010091 | A1* | 1/2011 | Currie et al. .................. 701/208 |

FOREIGN PATENT DOCUMENTS

| WO | WO9305492 | 3/1993 |
| WO | WO 2008001125 | 1/2008 |

OTHER PUBLICATIONS

Search Report From corresponding PCT Application No. PCT/US2011/022307, May 17, 2011.
Search Report and Written Opinion From corresponding PCT Application No. PCT/US2011/022307, dated Sep. 7, 2011.

* cited by examiner

*Primary Examiner* — Thomas G. Black
*Assistant Examiner* — Marthe Marc-Coleman
(74) *Attorney, Agent, or Firm* — Joseph J. Christian

(57) ABSTRACT

A system for determining instances when a vehicle's indicated speed exceeds a governing speed includes a receiver to receive information from which a vehicle's location envelope, indicated direction of travel, and indicated speed can be derived, and a processor. The processer is configured to ascertain a location envelope in which the vehicle is located, an indicated speed of the vehicle, and a direction of travel of the vehicle at a sample time. It is also configured to select the governing speed for the vehicle at the sample time, which includes ascertaining possible road segments with at least a portion within the location envelope, eliminating road segments with a road segment direction of travel inconsistent with the indicated direction of travel, and selecting as the governing speed a speed associated with a remaining road segment. The processor will then determine if the indicated speed exceeds the governing speed.

37 Claims, 3 Drawing Sheets

SYSTEM AND METHOD FOR ESTIMATING AND DETECTING SPEED

FIELD OF THE INVENTION

The present invention is generally related to a remote vehicle management system. In particular, this invention relates to a system that permits monitoring of individual vehicles of a fleet of vehicles in order to gather information related to the movement of each vehicle, with particular interest in determining if a vehicle is exceeding the posted speed limit.

BACKGROUND OF THE INVENTION

Capturing instances when a vehicle travels above a posted speed limit, (i.e. a speeding exception), is an important factor in managing a fleet of vehicles. Accurate information regarding speeding exceptions may improve assessments on insurance rates, and may enable a fleet manager to improve fuel consumption, and safety and compliance. Methods of determining the speed a vehicle is traveling, (i.e. the indicated speed) are known. However, accurate methods of determining the speed that governed the vehicle (i.e. the posted speed), when the vehicle was traveling the indicated speed, are not known.

Traditionally two approaches have been taken to determine if speeding exceptions have occurred. One is to set a threshold posted speed for all travel. For example, a threshold posted speed of 70 mph may be chosen. In this example, only if a vehicle is traveling over 70 mph will an exception be registered. This method does not accurately assess speeding exceptions because it does not take into account the actual posted speed. For instance, if the posted speed limit is 35 mph, and the vehicle is traveling at an indicated speed of 65 mph, a notable instance of speeding will not be registered because the indicated speed is below 70 mph. Conversely, if the vehicle is traveling at an indicated speed of 72 mph and the posted speed limit is 70 mph, a speeding exception will be noted.

A second approach assigns a posted speed to a right of way based on what type of right of way it is. For example, when speaking of automobiles, right-of-ways are roads of differing types, with individually assigned speeds. Examples include a highway at 55 mph, a local highway at 40 mph, primary/secondary streets at 35 mph, or a local street at 25 mph. Such an approach may be more accurate than the prior approach, but is still inaccurate because a highway may have a posted speed that differs from 55 mph, as may the other road types. In this approach as well, speeding exceptions may be missed, (i.e. false negatives), and instances of non-speeding may be recorded as a speeding exception, (i.e. a false positive). Consequently, there remains a need in the art for a way to accurately assess speeding exceptions.

BRIEF DESCRIPTION OF THE INVENTION

In one aspect thereof, the present invention provides a system for determining instances when a vehicle's indicated speed exceeds a governing speed, which includes a receiver to receive information from which a vehicle's location envelope, indicated direction of travel, and indicated speed can be derived, and a processor. The processer is configured to ascertain a location envelope in which the vehicle is located, an indicated speed of the vehicle, and a direction of travel of the vehicle at a sample time. It is also configured to select the governing speed for the vehicle at the sample time, which includes ascertaining possible road segments with at least a portion within the location envelope, eliminating road segments with a road segment direction of travel inconsistent with the indicated direction of travel, and selecting as the governing speed a speed associated with a remaining road segment. The processor will then determine if the indicated speed exceeds the governing speed.

In another aspect, the invention provides a computer readable medium including program instructions for execution on a computer system, which when executed by a computer, cause the computer system to determine when a vehicle's indicated speed exceeds a governing speed. The steps include ascertaining a location envelope, an indicated speed of the vehicle, and an indicated direction of travel of the vehicle at a sample time using geodetic data, selecting a governing speed for vehicle at the sample time, and determining if a value of the indicated speed is greater than the value of the governing speed. Selecting a governing speed for vehicle at the sample time includes ascertaining possible road segments with at least a portion within the location envelope, eliminating road segments comprising a direction of travel inconsistent with the indicated direction of travel, and selecting as the governing speed a speed associated with a remaining road segment.

In another aspect, the invention provides a method for determining when a vehicle's indicated speed exceeds a governing speed. The method includes ascertaining a location envelope, an indicated speed of the vehicle, and an indicated direction of travel of the vehicle at a sample time using geodetic data, selecting a governing speed for the vehicle at the sample time, and determining if a value of the indicated speed is greater than the value of the governing speed. Selecting a governing speed for vehicle at the sample time includes ascertaining possible road segments comprising at least a portion within the location envelope, eliminating road segments comprising a direction of travel inconsistent with the indicated direction of travel, and selecting as the governing speed a speed associated with a remaining road segment.

BRIEF DESCRIPTION OF THE DRAWINGS

The invention is explained in the following description in view of the drawings that show.

DETAILED DESCRIPTION OF THE INVENTION

Figure 1A:
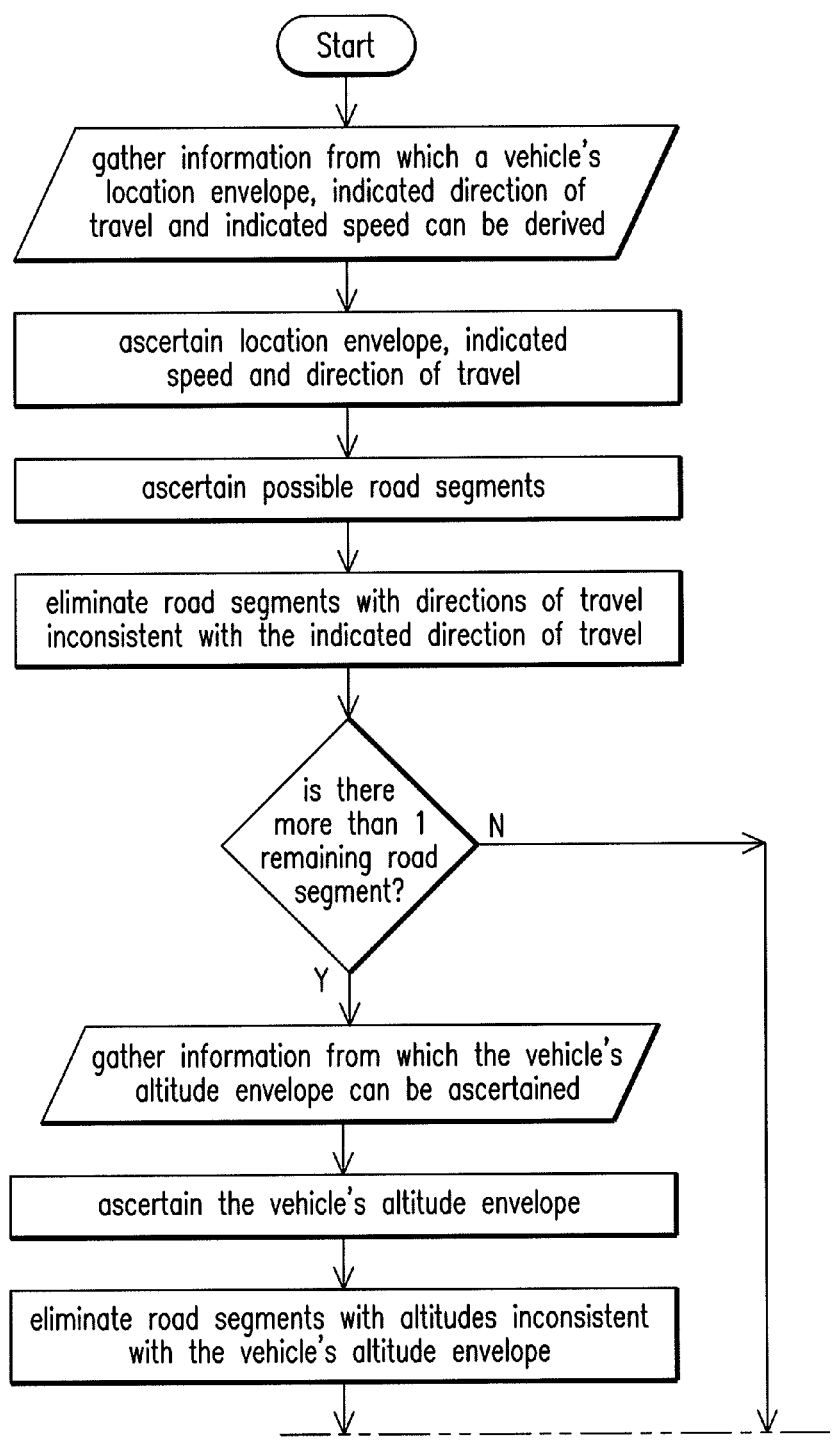
FIG. 1 is a flowchart showing steps involved with determining if a speeding exception has occurred.

The present inventors have devised an innovative way to accurately determine a posted speed that governed a vehicle when the vehicle was traveling at an indicated speed. Using this, a fleet manager can learn when speeding exceptions occur, gather information about speeding exceptions, and use that information to reduce the number of speeding exceptions. As a result, insurance costs and fuel costs may decrease, accidents and associated costs may decrease, and safety may increase.

The system disclosed herein can be used to monitor a fleet of vehicles on a right-of-way. A fleet may be any number of vehicles, down to and including a single vehicle. A vehicle may be any type of vehicle whose speed is governed, including automobiles, trucks, trains, boats, and airplanes etc. Accordingly, a right of way may be any way in with speed restrictions, such as a road, a train track, a waterway, or airspace. The disclosure will speak in terms of a vehicular embodiment, but this is not meant to be limiting.

Further, the disclosure will use latitude and longitude from GPS systems as the source of geodetic information from which the vehicle's location can be derived, but this is not meant to be limiting. A road segment is broadly defined as a segment of road between interchanges in a single direction of travel. A posted speed is the actual speed limit posted on the road, on which law enforcement will generally rely for enforcement purposes. A speed associated with the road segment is part of road segment data and may be the posted speed, or it may be a speed assigned based on the road type, or it may be a speed assigned based on other criteria. Often the speed associated with a road segment will be supplied by a third party, such as a company that gathers such data, but it may be supplied by an administrator, and it may be changed at any time by an administrator. The governing speed is the speed chosen as the speed against which the indicated speed is compared, i.e. the governing speed is the speed used as the posted speed.

The method generally requires ascertaining the indicated speed of the vehicle, the posted speed limit that governed the vehicle when the vehicle was traveling at the indicated speed, and determining if the indicated speed exceeds the posted speed.

Ascertaining the indicated speed is fairly straightforward, and can be accomplished in several ways. For example, the indicated speed can be the speed indicated by the speedometer in the vehicle, the speed indicated by the engine control unit (ECU), or the speed calculated using geodetic references such as latitude and longitude. Geodetic reference information may be supplied by a global positioning satellite receiver in the vehicle. The indicated speed may be any one of these, or may be derived from any one or combination of these, such as an average of the values, or the value determined to be the most accurate. If the speed is calculated, it can be calculated in the vehicle, or in a separate location, such as a central processing station. Such a central processing station may be an enterprise system, or simply a back-end. If a back-end is used, there must be a communication path between the vehicle and the back-end. Typically this may include a transmitter in the vehicle, and a receiver in communication with the back-end.

Ascertaining the posted speed involves multiple steps. Known geodetic databases contain detailed information about the earth, including the right-of-ways. In an embodiment concerning vehicles, the right of ways may be broken down into road segments, and the road segments may have speeds associated with each road segment, and the speed associated with the road segment may be the posted speed governing vehicles on that particular road segment. As a result, once the road segment on which a vehicle is driving is determined, the posted speed may be determined.

Figure 1B:
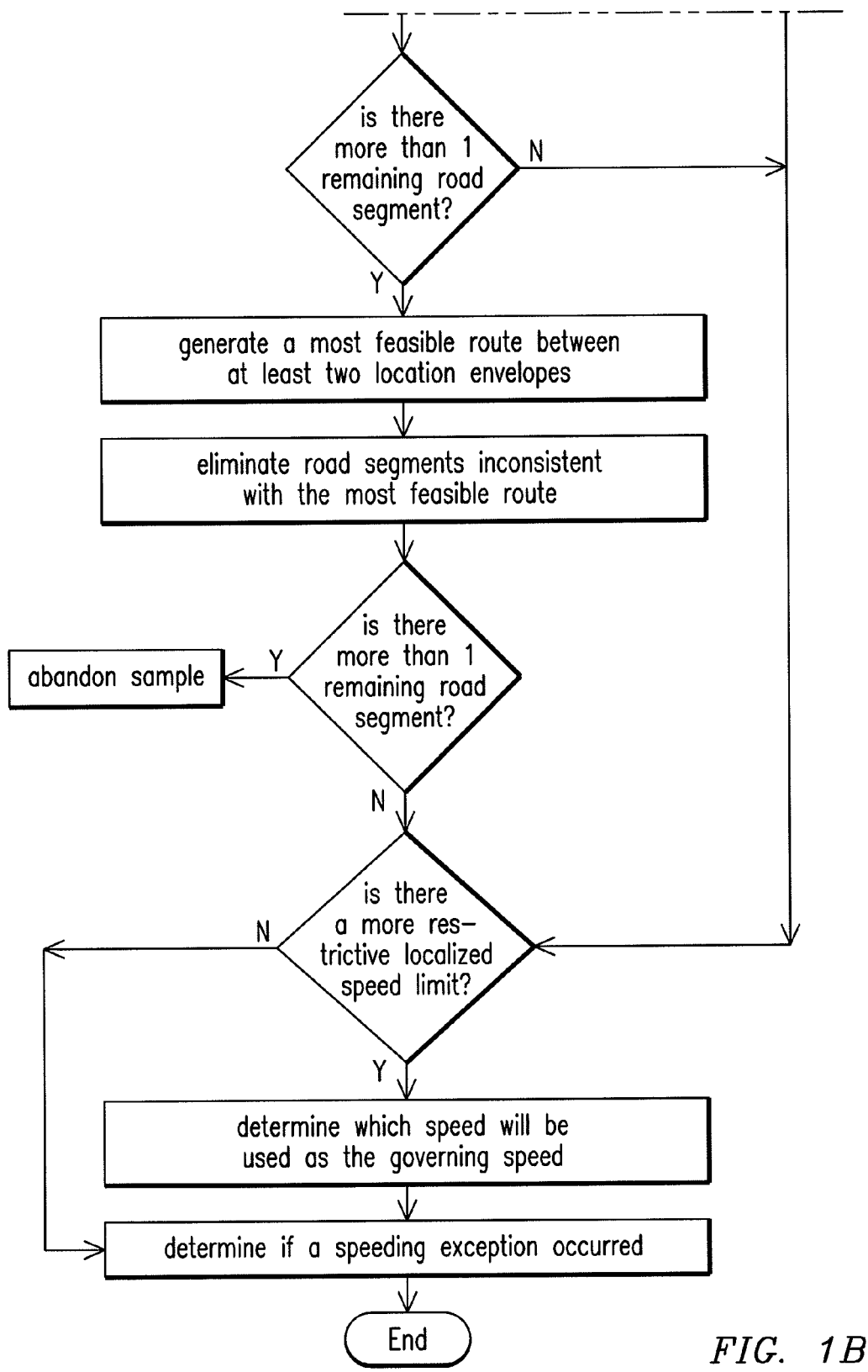

Ascertaining the relevant road segment is considerable more difficult. FIG. 1 shows a flow chart that depicts some of the step in ascertaining the relevant road segment, as discussed in detail below. A GPS system often will not be able to determine the exact location of a vehicle due to a number of factors. For example, the accuracy may vary due to the number of satellites used to determine the location etc. As a result, often the information of a vehicles location is ascertained within a certain tolerance. Such a tolerance may vary up to, for example, 30 meters. As a result, the vehicle may be at any point inside the envelope (i.e. location envelope) defined by this tolerance. The size of this location envelope is often large enough that it encompasses more than one road segment. As a result of this inaccuracy, there several road segments would appear to be possible road segments on which the vehicle may be traveling because more than one road segment may have a portion inside the location envelope. Each road segment may have a different speed associated with it, making it impossible to determine which posted speed applies to the vehicle. A specific example of such a situation arises when a vehicle is traveling on an elevated roadway governed by a first speed and the indicated speed is measured when the vehicle is above another road governed by a second speed. A more complicated situation would be if several overpasses existed at the same time, such as is the case in some complex, urban environments. Another example includes adjacent roads governed by different posted speeds. In such instances, this method eliminates road segments through a variety of ways in an effort to find the correct road segment. These techniques can be used by themselves or in any combination and sequence necessary to reach the appropriate road segment.

A technique that can be used for eliminating unlikely road segments from consideration involves determining the vehicle's indicated direction of travel. This can be ascertained from an onboard direction indicator, such as a compass etc, or can be calculated using a prior geodetic reference point, which together with the current geodetic reference point, would form a line, and thus a direction of travel could be ascertained. Road segments often contain information regarding the direction of travel of the road segment. Once the indicated direction of travel of the vehicle is ascertained, the indicated direction of travel is compared to the direction of travel of all possible road segments. Road segments with directions of travel inconsistent with the indicated direction of travel will be eliminated from consideration. Often this will reduce the list of possible road segments to one remaining road segment, and thus the speed associated with the road segment can be determined. Once the speed associated with the road segment is ascertained, whether a speeding exception has occurred can be determined. Also, the vehicle location would also be known at this point. The vehicle location is defined as the location of the portion of the remaining road segment inside the location envelope, unless there is no such road segment, in which case the vehicle location is deemed to be the location envelope. Since the vehicle location is known at the time of the sample, if a speeding exception occurred at the time of the sample, the location of the vehicle at the time of the sample, i.e. the location of the speeding exception, would also be known.

It is known that these speeds associated with a road segment are not available for every road segment, and the posted speeds that are available may not be accurate. As a result, provision is made for an administrator, (i.e. anyone with permission) to manually assign a speed to be associated with a road segment. This offers much greater flexibility to a fleet manager. For example, posted speed limits assume certain driving conditions, and under special conditions a speed lower than the posted speed may be required in order to remain safe. Such conditions may include deteriorated road conditions, or more transient events such as fog or ice etc. A fleet manager may assign lower speeds to a road segment because the fleet manager has particular knowledge of the special conditions that warrant such a change. In an embodiment any speeding exceptions may be made known to a driver as it occurs, and as such, the fleet manager would be able to more closely control a vehicle's speed by taking into account conditions that posted speed limits do not.

Another technique that can be used to eliminate unlikely road segments involves determining the vehicle's altitude. Similar to a vehicle's latitude and longitude, a vehicle's height is generally known to within a certain tolerance. As a result, the location envelope of a vehicle can be represented as a sphere, or oval shape. Road segments sometimes contain elevation data for road segments. Each road segment may have its own elevation. Once the indicated altitude of the vehicle is ascertained, the indicated elevation is compared with the altitude associated with the road segment. Road segments with elevations inconsistent with the indicated elevation will be eliminated from consideration. If this reduces the list of possible road segments to one remaining road segment, then the speed associated with the road segment can be ascertained, as can speeding exception information. This technique is particularly helpful in situations where at least a first road segment passes over a second road segment, and the road segments have different posted speeds.

An additional technique that can be used to eliminate unlikely road segments involves using information related to a pre-planned route the vehicle was expected to take. Possible road segments can be compared to road segments present in the pre-planned route, and those possible road segments inconsistent with the preplanned route may be eliminated.

Yet another technique that can be used to eliminate unlikely road segments takes advantage of route-optimization software. In such an instance, a first location envelope is determined as well as a second location envelope, and a direction of travel. The location envelopes and direction of travel may be fed into route optimization software and the software may generate a most feasible route between the two. Road segments inconsistent with the most feasible route may then be eliminated. An example where this may be helpful may include eliminating road segments with directions of travel inconsistent with the most feasible route, such as one-way streets opposite the most feasible route. This may also be helpful when there is no pre-planned route.

Such route optimization software may utilize algorithms such as the Djikstra optimization algorithm, or the Belman-Ford optimization, or a combination of two or more algorithms. Such an algorithm may consider factors such as cost, distance, time, permissions, and complexity, or a combination of one or more of these constraints and or other user defined constraints.

Although a speed associated with a road segment may be ascertained from the data available from companies that gather such data, there may be other conditions that alter the governing speed. Such factors can create localized areas of a road segment with localized speed limits. Often, but not always, these localized areas and speeds may be transient. Sometimes these localized speed limits may be associated with points of interest, such as schools. For example, school zones impose speed restrictions more stringent than the posted speed limit, but only for very short times during limited hours. Construction zones may also impose similar, more stringent restrictions. If it is determined that the localized speed limit was in effect at the time the indicated speed was taken, the localized speed limit may be accepted as the governing speed, in lieu of accepting the speed associated with the road segment. Speed exceptions of this type may be particularly detrimental, yet most elusive to detect, rendering this technology particularly beneficial.

If these localized speed limits are known ahead of time they may be accounted for by, for example, a geodetic data company that supplies the information, or an administrator, who may define such local geographies, the localized speed limit, and the effective times of the localized speed limit.

In addition, if a speed associated with a road segment is not available, one can be derived using characteristics of the road segment, and other available data. For example, a speed associated with a road segment is not available of a road segment, but is available for road segments upstream and downstream of the road segment. If the upstream and downstream speeds associated with the respective road segments are the same, that same speed may be selected as the posted speed. The algorithm may also check to see if the surrounding road segments are of the same road type etc. Any number of techniques can be used to derive a speed associated with a road segment using this type of data that suggests a speed for the road segment in question.

Any combination of the techniques disclosed herein can be used to arrive at the relevant road segment, and correct speed associated with that road segment, for a single indicated speed and governing posted speed. Systems are envisioned that may use single data points, and systems are envisioned that may use multiple data points. If a speed associated with a road segment cannot be derived, the sample may be abandoned, and the process run again with another sample.

Even further, any of the techniques disclosed herein can be used as a check to confirm, (as opposed to determine), an ascertained speed associated with a road segment. For example, an algorithm can infer a speed associated with the road segment based on information that would suggest such a speed. For example, the algorithm can look to adjoining road segments for information, and can infer a speed for the road segment in question. If the supplied speed associated with a road segment varies significantly from the inferred speed, the algorithm may choose to disregard the supplied speed associated with the road segment, and replace it with the inferred speed. How much variation is acceptable is up to the administrator and can be changed as necessary. For example, if the speed associated with the road segment in question varies by more than a certain percentage, or threshold value, the inferred value may be used. The algorithm may also choose not to determine if a speeding exception has occurred, i.e. it may simply ignore the sample. Geodetic information is subject to the same inaccuracies as other information, so such a system of checks may be built into the system.

Figure 2:
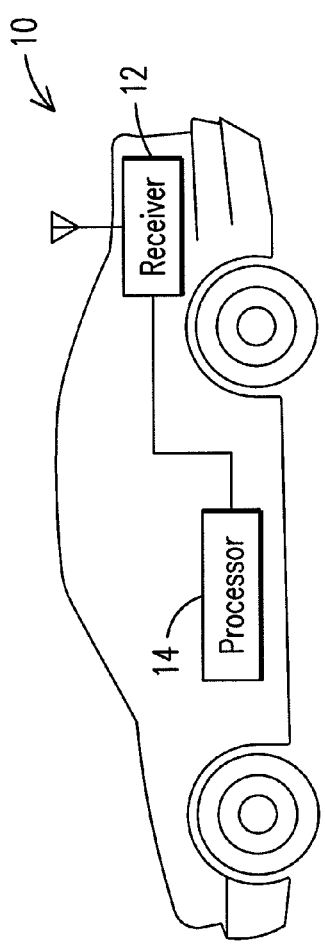
FIG. 2 is a schematic of an embodiment of the system used to determine speeding exceptions.

One the embodiments envisioned that may take advantage of single data points may be a simple, portable unit that may be located in a vehicle. Such a system 10 can be seen in FIG. 2, and may include a receiver 12 to receive geodetic information, or information from which geodetic information can be derived, and a processor 14. Such a unit may perform calculations and have stored geodetic data such that it can determine speeding exceptions. It could simply log speeding exceptions, or it could alert when a speeding instance occurs. For example, it could display the governing speed for a driver. Such information may be helpful when the driver has not seen the posted speed limit, or the speed limit is not frequently posted. It could alert an inattentive driver who may exceed the speed limit. It could also alert another when the driver exceeds the governing speed limit, for example, by page, phone call, or email. Such an alert may be considered particularly valuable information to a vehicle owner when the driver is, for example, that vehicle owner's child. Such a portable unit may also use multiple data points as well.

Figure 3:
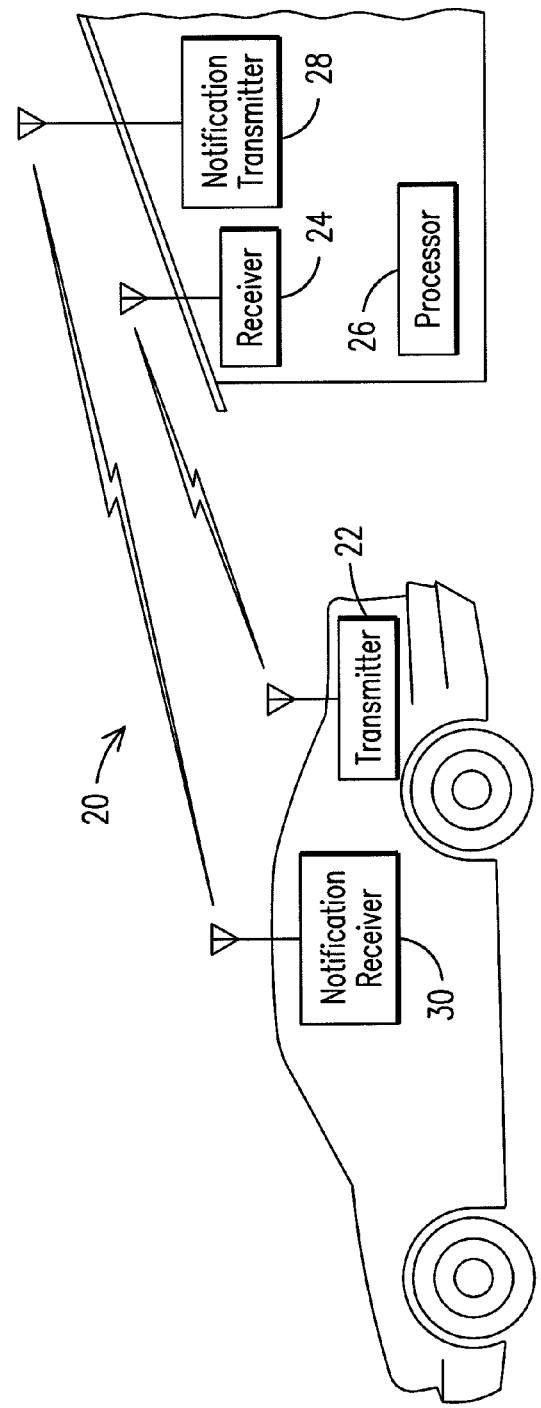
FIG. 3 is another embodiment of the system used to determine speeding exceptions.

An embodiment envisioned that uses more than one data point is one where a fleet manager may wish to monitor multiple vehicles simultaneously. Such a system 20 can be seen in FIG. 3, and may include a transmitter 22 in a vehicle, a receiver 24 at a remote location, and a processor 26. The system 20 may further include a notification transmitter 28 which can transmit notification information to the vehicle, for example, that a speeding exception has been ascertained, and a notification receiver 30 in the vehicle to receive the notification information. Such a system may be, for example, an enterprise-level system, and may gather many data points.

The data may be gathered over time and sorted as needed to be useful to the fleet manager. For example, all data points associated with a particular driver and route on a given day may be presented together. This may manifest itself as a graphic representation of the route on a map, and speeding exceptions may be indicated graphically, such as by a different color, or with an indicator of some kind, like an arrow. A similar presentation may be made using multiple instances daily routes of a given driver. Similarly, data points from different drivers, and different routes can be represented on a map.

A statistical model may be developed that analyzes the speeding exceptions for patterns. The data may also be available for searching such that patterns may be discovered. For example, a statistical model may attempt to discover if any areas, such as intersections, or downhill portions of a road, may be prone to speeding exceptions. Information like this could be passed to the drivers, which alone may increase compliance and safety. In addition, the method envisions locating points of interest near speeding exceptions. Points of interest may include customer buildings, restaurants, gas stations, or anything deemed of interest in detecting patterns. For example, if multiple speeding exceptions are noted near a particular point of interest, one may be able to investigate to see what the connection is. If speeding exceptions are noted toward the end of a driver's route, route modification may be considered.

Further it is understood that speeding exceptions vary in their nature. Some speeding exceptions may be deemed minor, such as only a few mph above a posted speed for only a brief period. Other speeding exceptions may be deemed serious. For example, an exception grossly in excess of the posted speed limit in a school zone for an extended time. Another example may include multiple instances of otherwise minor exceptions. As a result, an algorithm may be used which will enable an administrator to set adjustable guidelines as to which speeding exceptions are reported and which are not. As a result, ascertained speeding exceptions may or may not be reported. Those that are reported may be classified according to a degree of the speeding exception. The reporting parameters are adjustable to accommodate almost any requirements.

The information generated may be made available in any number of ways, including displaying on maps, as data in databases, as email or telephone notifications etc. Further, the information may be posted in a manner that a fleet manager can access the information from a remote location. For example, the information may be displayed graphically on a map, and the map may be available on the internet, making it accessible from anywhere.

An additional advantage to this system is that fleet managers also often utilize route optimization programs to create pre-planned routes for the drivers. Over time any information related to patterns made known the statistical model, or otherwise learned from the gathered information, can be supplied to the route optimization program. The route optimization program can the take advantage of this information and create revised optimized pre-planned routes in a way that minimizes exposure to the situations that tend to generate instances of speeding. For example, the route optimization program may avoid downhill stretches of road, or a school zone, or some point of interest that may have a particular effect on a particular driver. The amount of tailoring of the route may be limited only to the imagination and desire of the fleet manager. Such route optimization may decrease instances of speeding, but may simultaneously also produce faster routes, and those are two paramount goals of fleet management. All of this can be accomplished with little to no additional investment in hardware for a fleet manager.

It has been shown that the present inventors have devised an innovative way to accurately ascertain the occurrences of speeding exceptions. This technology will enable fleet managers to better monitor a fleet, increase compliant driving, increase safety, reduce insurance costs, and increase operational efficiency, with technology that takes advantage of existing hardware.

It should be understood that the inventive system and method disclosed herein may be implemented in any appropriate operating system environment using any appropriate programming language or programming technique. The invention can take the form of a hardware embodiment, a software embodiment or an embodiment containing both hardware and software elements. In a preferred embodiment, the invention is implemented in software (controls) and hardware (sensors), which includes but is not limited to firmware, resident software, microcode, etc. Furthermore, parts of the invention can take the form of a computer program product accessible from a computer-usable or computer-readable medium providing program code for use by or in connection with a computer or any instruction execution system. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The display may be a tablet, flat panel display, PDA, or the like.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for determining instances when a vehicle's indicated speed exceeds a governing speed, comprising:
  a receiver to receive information from which a vehicle's location envelope, indicated direction of travel, and indicated speed can be derived;
  a processor configured to:
    ascertain a location envelope in which the vehicle is located, an indicated speed of the vehicle, and a direction of travel of the vehicle at a sample time;
    select the governing speed for the vehicle at the sample time, comprising:

ascertain possible road segments comprising at least a portion within the location envelope, eliminate road segments comprising a road segment direction of travel inconsistent with the indicated direction of travel, select as the governing speed a speed associated with a remaining road segment; and determine if the indicated speed exceeds the governing speed, wherein an altitude envelope of the vehicle can be derived from the information, and wherein the processor ascertains an indicated vehicle altitude envelope, and wherein select a governing speed further comprises eliminating road segments comprising elevations inconsistent with the altitude envelope of the vehicle.

2. The system of claim 1, wherein select a governing speed comprises generate an inferred governing speed using suggestive information that suggests a speed for the remaining road segment, compare the inferred governing speed and the speed associated with the remaining road segment, and determine which value should be used, or if the determination should be abandoned for that sample time.

3. The system of claim 1, further comprising a transmitter to transmit the information from the vehicle to a remote processor.

4. The system of claim 1, comprising a notification transmitter to transmit speeding exception information to the vehicle, and a notification receiver in a vehicle to receive the speeding exception information, wherein upon determination of a speeding exception, a notification is sent to a driver that the speeding exception has been ascertained.

5. The system of claim 1, wherein the information from which a vehicle's location envelope can be derived comprises latitude and longitude, and wherein the information from which a vehicle's indicated speed can be derived comprises a value determined by the vehicle, or geodetic information from which the speed can be calculated.

6. The system of claim 1, wherein the speed associated with the remaining road segment is supplied by a third party or by an administrator.

7. The system of claim 1, wherein select a governing speed comprises eliminating road segments inconsistent with a pre-planned route.

8. The system of claim 1, wherein select a governing speed comprises generating a most-feasible route comprising at least two location envelopes utilizing route-optimization software, and eliminating road segments inconsistent with the most-feasible route.

9. The system of claim 8, wherein the route-optimization software is based on at least one of a Djikstra optimization algorithm and a Belman-Ford optimization algorithm.

10. The system of claim 1, wherein select a governing speed comprises locating nearby points-of-interest of a type that impose a localized speed limit on the remaining road segment, and determining if the localized speed limit should be selected as the governing speed.

11. The system of claim 10, wherein the localized speed limit is supplied by a third party or by an administrator.

12. The system of claim 1, wherein the processor is further configured to develop a statistical model to identify patterns associated with speeding exceptions.

13. The system of claim 12, wherein the processor is configured to supply pattern information regarding patterns associated with the speeding exceptions to a route optimization program database thereby enabling the route optimization program to consider the pattern information when optimizing a route.

14. The system of claim 1, wherein the processor is configured to locate points-of-interest nearby a location of speeding exceptions.

15. The system of claim 14, wherein the processor is further configured to develop a statistical model to identify patterns between speeding exceptions and the points-of-interest nearby the location of speeding exceptions.

16. The system of claim 15, wherein the processor is configured to supply pattern information regarding patterns between the speeding exceptions and the points-of-interest nearby the location of speeding exceptions to a route optimization program database, thereby enabling the route optimization program to consider the pattern information when optimizing a route.

17. The system of claim 1, wherein the processor is configured to process the speeding exceptions and locations for speeding exceptions for a plurality of vehicles.

18. A computer readable medium comprising program instructions for execution on a computer system, which when executed by a computer, cause the computer system to determine when a vehicle's indicated speed exceeds a governing speed, comprising:

ascertaining a location envelope, an indicated speed of the vehicle, and an indicated direction of travel of the vehicle at a sample time using geodetic data;

ascertaining an indicated elevation envelope of the vehicle;

selecting a governing speed for vehicle at the sample time, comprising:

ascertaining possible road segments comprising at least a portion within the location envelope, eliminating road segments comprising a direction of travel inconsistent with the indicated direction of travel, eliminating road segments comprising elevations inconsistent with the indicated elevation envelope of the vehicle, selecting as the governing speed a speed associated with a remaining road segment; and determining if a value of the indicated speed is greater than the value of the governing speed.

19. The computer readable medium of claim 18, wherein selecting a governing speed comprises generating an inferred governing speed using suggestive information that suggests a speed for the remaining road segment, comparing the inferred governing speed and the speed associated with the remaining road segment, and determining which value should be used, or if the determination should be abandoned for that sample time.

20. The computer readable medium of claim 18, wherein select a governing speed comprises eliminating road segments inconsistent with a pre-planned route.

21. The computer readable medium of claim 18, wherein selecting a governing speed comprises generating a most-feasible route comprising at least two location envelopes utilizing route-optimization software, and eliminating road segments inconsistent with the most-feasible route.

22. The computer readable medium of claim 18, wherein selecting a governing speed comprises locating nearby points-of-interest of a type that impose a localized speed limit on the remaining road segment using a geodetic database, and determining if the localized speed limit should be selected as the governing speed.

23. The computer readable medium of claim 18, comprising developing a statistical model to identify patterns associated with speeding exceptions.

24. The computer readable medium of claim 18, comprising locate points-of-interest nearby a location of speeding exceptions.

25. The computer readable medium of claim 24, comprising developing a statistical model to identify patterns between the speeding exceptions and the points-of-interest nearby the location of speeding exceptions.

26. The computer readable medium of claim 18, comprising processing speeding exceptions and locations for speeding exceptions for a plurality of vehicles.

27. The computer readable medium of claim 18, comprising developing a statistical model to identify patterns related to instances of speeding and supplying pattern information to a route optimization program database, thereby enabling the route optimization program to consider the pattern information when optimizing a route.

28. A method for determining when a vehicle's indicated speed exceeds a governing speed, the method comprising:
  ascertaining a location envelope, an indicated speed of the vehicle, and an indicated direction of travel of the vehicle at a sample time using geodetic data;
  selecting a governing speed for the vehicle at the sample time, comprising:
    ascertaining possible road segments comprising at least a portion within the location envelope,
    ascertaining an indicated elevation envelope of the vehicle,
    eliminating road segments comprising a direction of travel inconsistent with the indicated direction of travel,
    selecting an accepted posted speed comprises eliminating road segments comprising elevations inconsistent with the indicated elevation envelope of the vehicle,
    selecting as the governing speed a speed associated with a remaining road segment; and
  determining if a value of the indicated speed is greater than the value of the governing speed.

29. The method of claim 28, wherein selecting a governing speed comprises generating an inferred governing speed using suggestive information that suggests a speed for the remaining road segment, comparing the inferred governing speed and the speed associated with the remaining road segment, and determining which value should be used, or if the determination should be abandoned for that sample time.

30. The method of claim 28, wherein select a governing speed comprises eliminating road segments inconsistent with a pre-planned route.

31. The method of claim 28, wherein selecting a governing speed comprises generating a most-feasible route comprising at least two location envelopes utilizing route-optimization software, and eliminating road segments inconsistent with the most-feasible route.

32. The method of claim 28, wherein selecting a governing speed comprises selecting an accepted posted speed comprises locating nearby points-of-interest of a type that impose a localized speed limit on the remaining road segment using a geodetic database, and determining if the localized speed limit should be selected as the governing speed.

33. The method of claim 28, the method comprising developing a statistical model to identify patterns associated with speeding exceptions.

34. The method of claim 28, the method comprising locating points-of-interest nearby a location of speeding exceptions.

35. The method of claim 34, the method comprising developing a statistical model to identify patterns between speeding exceptions and the points-of-interest nearby the location of speeding exceptions.

36. The method of claim 28, the method comprising processing speeding exceptions and locations for speeding exceptions for a plurality of vehicles.

37. The method of claim 28, the method comprising developing a statistical model to identify patterns related to speeding exceptions and supplying pattern information to a route optimization program database, thereby enabling the route optimization program to consider the pattern information when optimizing a route.

* * * * *